(12) United States Patent
Ritter, III

(10) Patent No.: US 8,568,682 B2
(45) Date of Patent: Oct. 29, 2013

(54) APPARATUS AND METHOD FOR THE CONDENSED PHASE PRODUCTION OF TRISILYLAMINE

(71) Applicant: Voltaix, Inc., Branchburg, PA (US)

(72) Inventor: Cole J. Ritter, III, Easton, PA (US)

(73) Assignee: Voltaix, Inc., Branchburg, NJ (US)

( * ) Notice: Subject to any disclaimer, the term of this patent is extended or adjusted under 35 U.S.C. 154(b) by 0 days.

(21) Appl. No.: 13/645,184

(22) Filed: Oct. 4, 2012

(65) Prior Publication Data

US 2013/0089487 A1    Apr. 11, 2013

Related U.S. Application Data

(60) Provisional application No. 61/544,468, filed on Oct. 7, 2011.

(51) Int. Cl.
*C01B 33/00*    (2006.01)
(52) U.S. Cl.
USPC ........................................... 423/324
(58) Field of Classification Search
USPC ........................................... 423/324
See application file for complete search history.

(56) References Cited

U.S. PATENT DOCUMENTS

| | | | |
|---|---|---|---|
| 3,809,713 A | | 5/1974 | Boersma et al. |
| 3,927,057 A | * | 12/1975 | Takamizawa et al. ........ 556/406 |
| 5,968,611 A | | 10/1999 | Kaloyeros et al. |
| 2008/0319148 A1 | * | 12/2008 | Oshima et al. ................ 526/133 |
| 2010/0310443 A1 | | 12/2010 | Miller |
| 2011/0136347 A1 | * | 6/2011 | Kovarsky et al. ............. 438/758 |
| 2011/0178322 A1 | | 7/2011 | Hamada et al. |

OTHER PUBLICATIONS

Wells et al., Studies of Silicon-Nitrogen Compounds. The Base-Catalyzed Elimination of Silane from Trisilylamine, Article, J. Am. Chem. Soc. 1966, 88 (1) pp. 37-42.
Fessenden et al., The Chemistry of Silicon-Nitrogen Compounds, Article, Chem. Rev., 1961, 61(4), pp. 361-388.
International Search Report and Written Opinion under PCT/US2012/058764 mailing date of Mar. 25, 2013.

* cited by examiner

*Primary Examiner* — Steven Bos
*Assistant Examiner* — Justin Bova

(57) ABSTRACT

The present invention is directed to a condensed phase batch process for synthesis of trisilylamine (TSA). An improved synthesis method that incorporates a solvent to help promote a condensed-phase reaction between ammonia gas (or liquid) and liquified monochlorosilane (MCS) in good yields is described. This method facilitates the removal of the byproduct waste with little to no reactor down time, substantial reduction of down-stream solids contamination and high-purity product from first-pass distillation.

12 Claims, 7 Drawing Sheets

APPARATUS AND METHOD FOR THE CONDENSED PHASE PRODUCTION OF TRISILYLAMINE

This application claims priority of U.S. Provisional Patent Application Ser. No. 61/544,468, entitled "APPARATUS AND METHOD FOR THE CONDENSED PHASE PRODUCTION OF TRISILYLAMINE" filed on Oct. 7, 2011, which is incorporated by reference herein.

FIELD OF THE INVENTION

This invention relates to a batch method for synthesizing silylamines, particularly trisilylamine in a solvent. The invention relates to a process that promotes reaction conditions suitable for a high efficiency synthesis of silylamines. The primary silylamine of interest is trisilylamine. Production of disilylamine in commercial quantities is also within the scope of the present invention.

BACKGROUND OF THE INVENTION

Trisilylamine ("TSA") is a useful molecule for use in semiconductor manufacturing. It is stable once produced, but is susceptible to decomposition from excessive reaction conditions and synthesis by-products. Dussarrat, et al. U.S. Pat. No. 7,192,626 demonstrated that a stable Silicon nitride film is formed on a substrate by feeding trisilylamine and ammonia into a CVD reaction chamber that contains a substrate.

Wells and Schaeffer (*J. Am. Chem. Soc.*, 88:1, 37 (1996)) discuss a batch method of preparing trisilylamine by the reaction silyl chloride with ammonia. They report the yield of trisilylamine varied depending on the method of mixing and the purity of the reactants. Wells and Schaeffer allowed the reactants to mix in the gas phase by introducing the ammonia from below into a 1 liter bulb containing silylchloride. After introducing the gaseous ammonia very slowly, the reaction bulb and contents were allowed to remain at room temperature for 15 min. Copious amounts of white solid were precipitated on the walls of the bulb as soon as mixing occurred. The product was removed and the trisilylamine recovered. The process yield was about 77% of the theoretical amount of trisilylamine.

In the batch reactor process, all of monohalosilane is charged into the reactor vessel. Batch size is limited by this initial charge and the size of the vessel. Ammonia gas is then slowly added into the flask. Reaction conditions will vary in the vessel depending on the initial concentrations of monohalosilane and ammonia and the efficiency of turbulent mixing in the vessel. The mixing is affected by vessel size as well as the efficiency of the mechanical mixing device if one is employed. In addition, during the batch process the silylamines produced are in contact with ammonium halide which is also a product of the reaction. Ammonium halides such as ammonium chloride are catalysts and will disproportionate TSA into silane and other degradation products thereby lowering the yield of TSA. The reaction of silyl halide and ammonia produces heat thereby exacerbating the degradation conditions in a closed reactor vessel.

US 2010/0310443 is directed to a tubular flow gas phase reactor and a process for the synthesis of silylamines which have been found to produce high volumes, at high efficiencies of silylamines. The reactor has a combination of characteristics found in plug flow and laminar flow devices. This combination of properties results in a high volume high efficiency synthesis of silylamines. The primary silylamine of interest is trisilylamine. Production of disilylamines in commercial quantities is also within the scope of the present invention. This process produces high volumes of ammonium halide requiring the reaction tube to be opened and cleaned after each production batch is produced. This is a labor intensive process leading to significant down time.

SUMMARY OF THE INVENTION

The present invention is directed to a condensed phase batch process for synthesis of TSA comprising: (a) adding a solvent to a reactor vessel; (b) cooling the solvent; (c) condensing monohalosilane into the solvent to form a solution; (d) adding anhydrous ammonia into the solution to form a reaction mixture; (e) separating the silylamines, excess monohalosilane and TSA from the reaction mixture; and (f) purifying the silylamines to obtain TSA;

Condensed phase reactions of excess monohalosilanes, such as monochlorosilane ("MCS") with ammonia, are beneficial since the formation of TSA occurs rapidly concomitantly producing ammonium halide salt which in the case of MCS is ammonium chloride ("$NH_4Cl$") salt. Such salts are localized in the reaction zone as a slurry with the solvent. This approach preferably utilizes a high boiling point solvent to act as a heat-transfer medium in which the ammonium chloride salt is dispersed and downstream product removal is devoid of salt formation. The general benefit of this approach is the formation of TSA in the condensed phase followed by vacuum stripping of the product from the reaction slurry and discharge of the waste salt/solvent slurry from the reactor vessel after which the reactor can be re-charged with solvent and excess, liquefied monohalosilane for another batch synthesis. In this condensed phase process, the reactor does not have to be cleaned before the next batch run as the ammonium chloride salt byproduct of the reaction is removed as a slurry in the solvent.

This condensed phase reaction scheme provides the following benefits:

A. Low temperature, condensed-phase reactions of ammonia with monohalosilane in a solvent in which the formation of TSA is enhanced over a relatively short period of time.

B, Suitable solvents such as anisole (methoxybenzene) provide vapor pressure depression/boiling point elevation of the MCS reagent, which promotes the formation of liquefied MCS and favorable condensed-phase disilylamine ("DSA") intermediate reaction kinetics.

C. The solvent acts as a uniform heat transfer medium in which byproduct waste salt is dispersed and localized predominantly in the reaction mixture.

D. The suppression of partially substituted silylamines (such as DSA) that could react further down stream during product collection.

The complete reaction is:

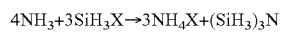

It is believed that the silylamines of the present invention are produced in accord with the following reaction sequence:

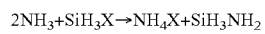

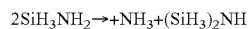

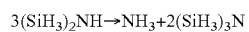

Where X=Cl, F, Br, I

BRIEF DESCRIPTION OF THE DRAWINGS

Specific embodiments of the invention are described below with reference to the following.

DETAILED DESCRIPTION OF THE INVENTION

Figure 1:
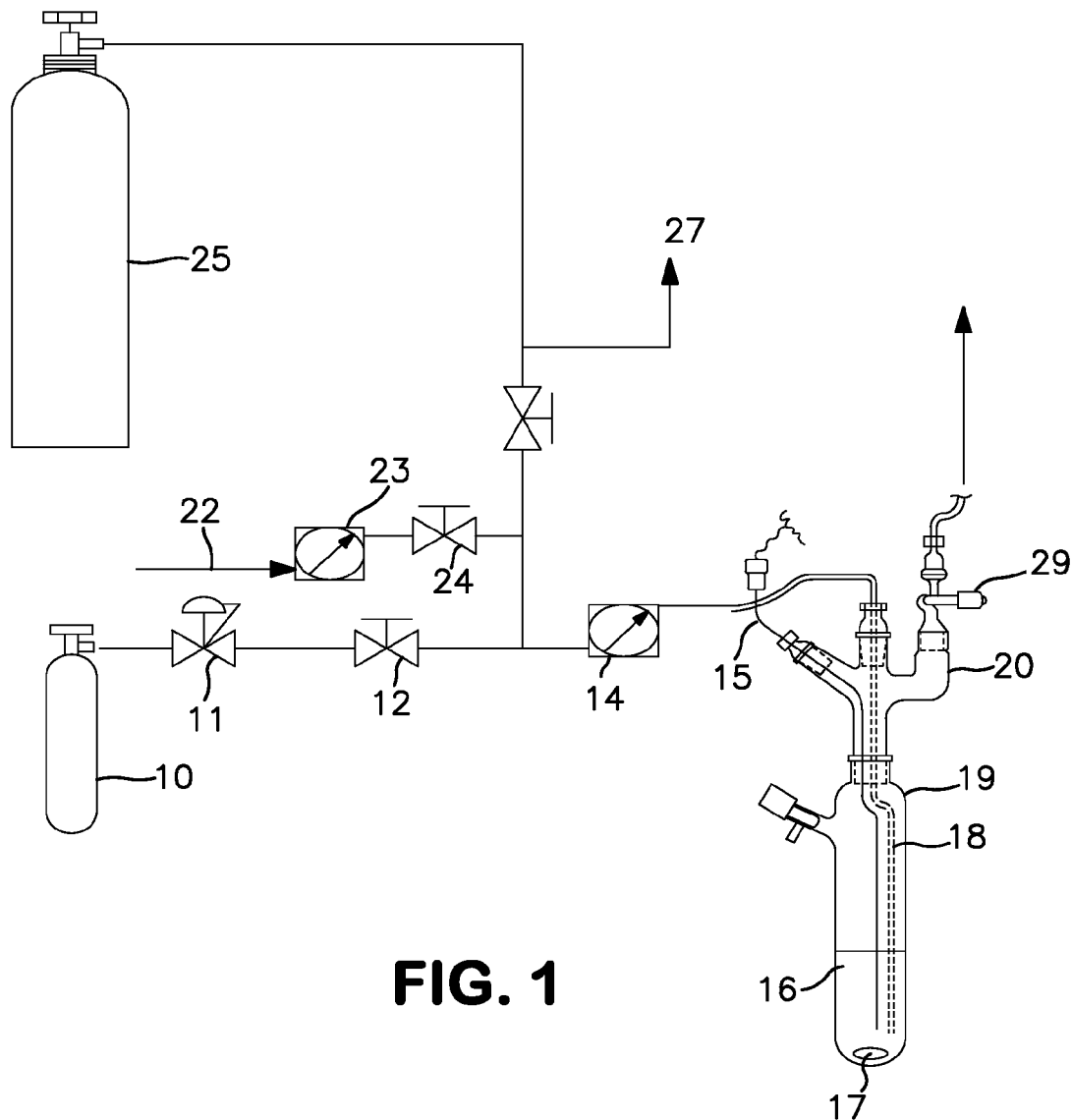
FIG. 1 is a simplified schematic diagram of a condensed phase reactor of the invention utilizing a Schlenk tube.

The general method of this invention includes the following:

Filling the reactor with an appropriate solvent (anisole, high boiling point ethers, aliphatic and aromatic hydrocarbons, etc.);

Adjusting the solvent or solvent formulation (one or more solvents) to a temperature range between 100° C. and −78° C.;

Condensing an excess of monohalosilane (relative to the final amount of ammonia added to the system) in a range of about 5 to about 300 mole %;

Adding anhydrous ammonia into the solution through one or more dip/sparge tubes that are below the liquid level at a rate that does not induce the formation of polysilazane and silane and reactions of the solvent with the reactants to form undesired products. A non-limiting list of factors affecting the rate of addition of ammonia into the solution include, volume of the solvent, concentration of the monohalosilane, temperature of the solvent reaction mixture, mixing efficiency, and the rate of heat transfer out of the reaction vessel. A preferred rate of addition of ammonia for moderate sized batch reactions would be from about 100 mg to 5 g/minute, for larger and production batches the rate of addition would be a function of batch size and therefore would be proportionately greater; a preferred temperature of the reaction solvent throughout the addition of is from about 70° C. to just above the freezing point of the solvent and reactant solution.

Separating the reaction products from the reaction solution. Preferred methods of separation include vacuum stripping or distilling the product mixture, which may be preceded by filtration, at reduced pressure once all of the ammonia has been added and collecting the distillates which contain the product(s) in a low temperature cryotrap. The temperature of the reaction mixture may be raised during vacuum stripping. In pilot scale batches the reaction mixture temperature has be raised to about 100° C. during vacuum stripping.

Purifying the product to obtain pure aminosilane. The preferred aminosilane is TSA; preferred purification processes are fractionation or distillation.

Mixing the waste ammonium chloride salts in solvent to suspend or slurry the solids in the solvent and either drain or pressure transfer the waste stream out of the reactor.

The reactor can then be re-charged for another batch synthesis).

In a preferred embodiment, anisole is the solvent and an excess of about 20 to about 50 mole % monohalosilane to ammonia is used and a reaction temperature of about 10° C. to about 60° C. In a preferred embodiment, the monohalosilane is MCS.

The preferred ammonia addition process is to react the ammonia and MCS in the solution and limit any gas-phase reactions in the headspace above the solution thereby avoiding ammonium chloride build up on the exposed surface of the reactor vessel and down stream of the reaction vessel such as in the cryogenic traps. Ammonium chloride salt found in the downstream storage vessels is referred to as "down stream salt."

The solvent aspect ratio is defined as the relationship of the height of solvent (liquid level) divided by the internal diameter of the reactor and is important relative to the path the ammonia or intermediate disilylamine (DSA) product has to travel to break through the surface of the liquid at the solvent-headspace interface.

The lower limit value for the aspect ratio is not critical but is an experience based guide for setting an anhydrous ammonia gas flow/feed rate in a particular reactor in light of the following parameters; solvent, MCS concentration, temperature and pressure.

Preferred operation of the reactor is achieved when the feed rate of the ammonia gas is adjusted such that all of the ammonia is reacted with MCS in solution and none of ammonia gas escapes the solution to enter the headspace above the solvent surface. Better gas dispersion methods, better mixing and a higher solvent aspect ratio are process methods that will support a higher ammonia gas flow rate thereby speeding processing time.

The preferred temperature range of the process is about −55° C. to about 60° C. In general, the lower limit of the operating temperature of the reaction process is the melting point of MCS in the solvent and the upper temperature limit is determined by engineering conditions such as to avoid product decomposition and reduced efficiency of the process. In the case of anisole, depending on how much MCS is added, there is a considerable melting point depression below the anisole melting point of −37.3° C. The melting point a given concentration of MCS in a particular solvent is easily determined by one skilled in the art without undue experimentation.

The solvent of the present invention acts as a heat transport medium and as a medium for dispersing ammonium chloride formed during the formation of TSA. The solvent must have all of the following characteristics:

Does not react with the starting materials, intermediates or final product

Has a boiling point or vapor pressure that allows for optimum distillation/product recovery.

The ratio of the vapor pressure of solvent to the vapor pressure of TSA at a given temperature is about 1:5, preferably about 1:10 or less to facilitate vacuum stripping of the reaction products from the solvent. In this description, a ratio of vapor pressure of 1:10 will be considered less than a vapor pressure ratio of 1:5. Conversely, a vapor pressure ratio of 100:1 will be considered greater than a ration of 10:1. In a preferred embodiment, the solvent is anisole and at a temperature of about 20 to about 40° C. the ratio of vapor pressure for anisole to TSA is 3.5:315 which equals about 1:90. The vapor pressure ratio is an important indicator of the separation efficiency for removing TSA and DSA from the solvent by vacuum stripping or distillation. A solvent with a low vapor pressure with respect to the vapor pressure of DSA and TSA will facilitate vacuum stripping of the DSA and TSA from the reaction solvent and collecting the DSA and TSA products.

A solvent with a high vapor pressure with respect to DSA and TSA will also facilitate removal of the solvent from the DSA and TSA leaving a concentrated DSA and TSA product in a storage vessel that will not collect the lower boiling higher vapor pressure solvent. The DSA and TSA products collected may then be further purified by standard techniques such as those disclosed herein and in the literature.

Suitable solvents are solvents that are aprotic, non-acidic (Lewis acidic) and solvents that do not form strong hydrogen bonds (N—H a source of hydrogen bonding). Preferred solvents are selected from the group consisting of high-boiling point, mono-oxygenated ethers non limiting examples are; R—O—R'; R=R'; and R≠R', wherein R and R' are linear, branched or cyclic alkyl groups. Mixtures of the solvents are suitable in the present inventive process. The boiling point, and therefore vapor pressure of preferred solvents would be either high or low relative to TSA. In examples, solvents were selected that had at least about a 1:10 vapor pressure ratio (solvent:TSA) relative to TSA in which TSA could easily be vacuum-stripped with little solvent transport. For example, TSA has a vapor pressure of 315 torr at 25° C., whereas anisole has a vapor pressure of 3.5 at the same temperature.

Several solvents were used in the examples. A preferred solvent is anisole. A non-limiting list of solvents useful in the present invention would include: anisole, m-xylene, toluene, ortho-xylene, high boiling ethers; di-n-butyl ether, di-t-butyl ether, di-sec-butyl ether, di-n-hexyl ether, methoxybenzene, dioxane (two oxygens, cyclic ether). See above, high volatility ethers may work as well such as diethyl ether and these latter ethers may be more difficult to separate from TSA due to their proximities in boiling points and vapor pressures. The high-boiling ethers are more preferred, aliphatic hydrocarbons: Such as heptane, decane, squalane, squalene, cyclohexane, cyclic and ring-fused hydrocarbons; aromatic hydrocarbons: toluene, xylenes (meta-, ortho-), fused aromatic compounds that have melting points below 0° C. are preferred. Mixtures of solvents are also within the scope of the invention.

Example 1

Synthesis Using a Schlenk Tube Reactor FIG. 1

A 250 mL Schlenk tube 19, fitted with an internal thermocouple probe (⅛" o.d. stainless steel, T-type) 15, ⅛" o.d. stainless steel ammonia sparge tube 18, and ¼" o.d. HDPE tubing was charged with 100 mL of anhydrous anisole under nitrogen. The tube was placed in a temperature controlled bath. The end of the sparge tube was raised above the liquid level and the solvent was cooled to −35° C. (freezing point of anisole is −37° C.). The head space nitrogen was then removed in vacuo from the Schlenk tube, with agitation of the solvent with magnetic stir bar 17, to a final pressure of less than 1 torr. A 7.8 L (internal volume) carbon steel cylinder, which contained 900 ton pressure MCS (26.4 g, 397 mmoles) 25 was then condensed (through tube 27) into the adjacent U-trap (not shown) with the reaction tube closed. The valve adapter (see FIG. 1) 29 on the Schlenk tube was then opened and the MCS in the U-trap was allowed to warm to ambient temperature, upon which it condensed into the reaction tube 19. The tube was cooled further to −60° C. and the internal pressure dropped to approximately 63 torr. (Further cooling of the solution to −65° C. resulted in the solvent freezing.) The reaction tube was then allowed to warm to −45° C. and a stream of house nitrogen was added to clear the sparge tube 18 of any MCS for several minutes. (The internal pressure increased during this time to 510 torr.) The ammonia cylinder (440 cc sslb containing 6.7 g $NH_3$, 393 mmoles; internal pressure approximately 100 psig) 10 was opened up and pressurized to valve 12. The inert gas purge was reduced by adjusting the rotameter (14, Cole-Parmer 65-mm correlated flow meter, Aluminum with SS float; PN: EW-32044-06) to a lower setting (approximately 80% flow reduction). The anhydrous ammonia feed was then started by closing 24 and opening 12; the ammonia pressure and flow rate were adjusted by manipulating 11 and 14 (FM setting at 50). The sparge tube was quickly submerged into the MCS/anisole solution 16 and a white precipitate was immediately formed.

The entire addition process was uneventful except for the formation of a mass of $NH_4Cl$ salt at the mid point of the solvent level in which no vortex was observed. Some gas breakthrough was observed toward the end of the addition. Very little salt formation was observed in the headspace and virtually no salt was observed at the top of the Claisen adapter 20. The Schlenk tube was periodically removed from the bath (not shown) and shaken to break up the ammonium chloride in the reaction zone. The ammonia feed rate was reduced (FM setting at 10) whenever this was done. The volatile components (i.e. hydrides) were vacuum stripped under dynamic vacuum (Schlenk tube at about −30° C. to about −10° C. during the course of hydride removal) through two U-traps, not shown and cooled to about −30° C. (solvent trap) and about −196° C. (TSA, MCS, silane trap) 20 minutes after the ammonia flow was shut off. A total of 16.74 g of hydride mix was in the −196° C. trap and less than 5 mL of solvent in the other trap. The contents of the former trap were condensed into a 440 cc stainless steel lecture bottle ("SSLB" not shown) and stored in a freezer (temperature at approximately −23° C.) until it was purified later via fractional condensation. A significant amount of ammonium chloride was left behind in the trap once the hydride mixture was removed; albeit most of the salt was left in the Schlenk reaction tube and the amount of salt in the trap was less than about a gram. Later purification, via fractional condensation into two traps cooled to −78° C. and −196° C., revealed that 170 mg of residue remained in the SSLB. A total of 6.8 g TSA (63.4 mmoles) was retained in the former trap and the latter trap contents were transferred back into the SSLB. The yield of TSA, based on the amount of ammonia "consumed" in the reaction, is 74.4% (98.8% purity checked by GC-MS analysis) with a total hydride recovery of 90+% (based on silicon content). No evidence of solvent fragmentation contamination was observed in the analysis of purified TSA.

Example 2

Figure 2:
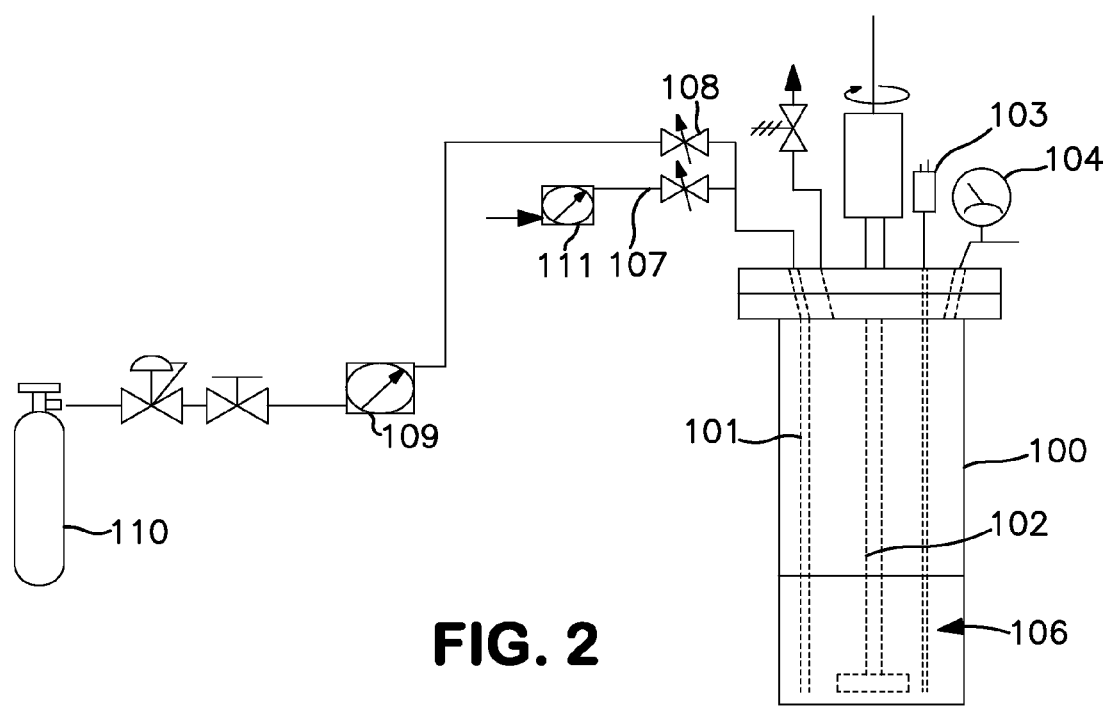
FIG. 2 is a simplified schematic diagram of a condensed phase reactor of the invention utilizing a Parr reactor vessel.

Synthesis using a 600 cc Parr reactor (FIG. 2). A 600 cc Parr 100 reactor was charged with 200 mL of anhydrous anisole 106 under nitrogen. (The reaction apparatus is shown in FIG. 2). The reactor was then cooled in an ice bath (not shown) and the nitrogen removed in vacuo. Monochlorosilane (65.7 g, 987 mmol., 200 mole % excess) was charged into the reactor through a dip tube 101. The internal pressure of the reactor was approximately 900 Torr at 0° C. The dip tube was then purged with nitrogen delivered through flow meter 111 and tube 107 to clear the line and dip tube. Anhydrous ammonia was immediately added to the reactor through the dip tube. The reactor was stirred with a stirring rod 102 throughout the entire reagent loading and reaction time at a rate of 250 rpm. The temperature and pressure was monitored via an internal K-type thermocouple 103 and a 0-60 psig pressure gauge 104. Anhydrous ammonia (7.5 g, 440 mmol.) was added to the reactor at a rate of 140 mg/min. over the course of 54 minutes from the ammonia cylinder (440 cc sslb containing 6.7 g $NH_3$, 393 mmoles; internal pressure approximately 100 psig) 110 through flow meter 109 and valve 108. The reaction mixture was stirred at 0° C. for an additional 45 minutes and the volatiles removed under dynamic vacuum.

The product gas was collected in a U-trap (not shown) held at −196° C. downstream from a solvent trap (U-trap) cooled to −35° C. Less than 2 mL of solvent was collected in the solvent trap. The product mixture was transferred to a 440 cc stainless steel lecture bottle and the contents were purified via fractional condensation using two U-traps cooled to −78 and −196° C. The contents of the −78° trap contained 9.84 g TSA (92 mmol., 83% yield) and the −196° C. trap contained excess MCS and trace silane.

Examples 3 to 7 were prepared by the procedure of Example 2 under the conditions described in Table 1. The yield of each example is reported in Table 1.

The first run was performed in glass, the rest in a 600 cc stirred Parr reactor. The gray boxes indicate product yields that may have contained a significant amount of solvent (toluene).

100 torr to about 1500 torr. A preferred operating pressure would be about two atmospheres or less. Maximum operating pressure is about 80 psig.

The present invention is directed to a process for preparing trisilylamine comprising:
(a) adding a solvent to a reactor vessel;
(b) condensing monochlorosilane into the solvent to form a solution;
(c) adding anhydrous ammonia into the solution to form a reaction mixture;
(d) separating the trisilylamine from the reaction mixture; and
(e) purifying the trisilylamine.

After the solvent is added to the reaction vessel, the temperature of the solvent may optionally be adjusted prior to condensing monochlorosilane into the solvent to form a solu-

TABLE 1

Summary of examples 1-7.

| | Experiment Number | | | | | | |
|---|---|---|---|---|---|---|---|
| | 1 | 2 | 3 | 4 | 5 | 6 | 7 |
| Solvent | Anisole | Anisole | Anisole | Toluene | Toluene | m-Xylene | Anisole |
| Solvent (mL) | 100 | 200 | 200 | 200 | 200 | 200 | 200 |
| MCS (g) | 26.4 | 54.E | 54.26 | 54.00 | 47.52 | 58.14 | 65.7 |
| MCS Concentration (g/mL) | 0.264 | 0.273 | 0.271 | 0.270 | 0.238 | 0.291 | 0.329 |
| MCS mole % excess | 55% | 25% | 140% | 163% | 88% | 150% | 200% |
| $NH_3$ consumed (g) | 5.80 | 14.91 | 7.70 | 7.00 | 8.60 | 7.90 | 7.50 |
| Solvent Aspect Ratio | 2:1 | 1:1 | 1:1 | 1:1 | 1:1 | 1:9 | 1:1 |
| Run Time (min.) | 63 | 142 | 120 | 86 | 49 | 80 | 54 |
| $NH_3$ Feed Rate (g/min.) | 0.092 | 0.105 | 0.064 | 0.081 | 0.176 | 0.099 | 0.139 |
| Reaction Temp. (° C.) | −30 | −25 to −30 | −25 | −35 | −38 | −30 | 0 |
| Salt Concentration (g/mL) | 0.137 | 0.184 | 0.091 | 0.082 | 0.101 | 0.093 | 0.088 |
| TSA (g) | 6.80 | 15.90 | 8.65 | 6.26 | 3.60 | 4.60 | 9.84 |
| Yield (ammonia basis) | 74% | 68% | 71% | 58% | 27% | 38% | 83% |
| % Salt downstream | <5°/n | 13% | 3% | 0% | 0.1% | 0.8% | 2.3% |

In examples 4 and 5 below, the yield and mole percent hydrides recovered results may contain residual solvent contamination. The "% salt downstream" indicates a weight percentage of ammonium chloride that is collected in the cryotrap from the maximum amount calculated (theoretical amount) for each experiment.

The reactants are contacted in a manner that optimizes reaction conditions thereby avoiding excessive reaction conditions such as heat build up from the exothermic reaction which can result in product decomposition and the formation of synthesis byproducts, notably silane and silazane polymers. For example, the process causes the ammonium halide by product of the reaction to stay in the reactor while the gaseous products such as disilylamine and trisilylamine are vacuum stripped from the solvent mixture and flow out of the reactor and are collected in a cold trap vessel substantially free of ammonium halide and solvent which can cause decomposition of the hydride products. The ammonium halide byproduct of the synthesis is crystalline under reaction conditions, therefore it remains in the solvent in the reactor while the gaseous products continue to travel up the reactor and out of the reactor. The boiling point of trisilylamine is 52° C. at one atmosphere.

The reactor is run at reduced pressure or at pressures up to about 2000 Torr. Preferably the reactor is kept at pressure of about equal to or lower than the vapor pressure of the monohalosilane at any given reaction temperature. In operation, the reactor pressure will drop as the monohalosilane is depleted. Preferably maintaining the reactor internal pressure at about tion. The temperature of the solvent may be adjusted from about 70° C. to about −78° C., preferably about 60° C. to about −20° C., and most preferably from about 50° C. to about −20° C.

Monohalosilanes useful in the present invention include monofluorosilane, monochlorosilane, monobromosilane and monoiodosilane. Monochlorosilane is preferred.

Summary Examples 8 to 13

TSA was synthesized in a 4 L Autoclave stirred-tank reactor with anisole as the solvent media. A total of six runs were conducted with varying target reaction temperatures, excess MCS amounts and the solvent to $NH_3$ ratio. Based on the results of the runs the following reaction conditions are recommended:

Reaction Temperature equals about 20° C. to about 60° C.
Excess MCS amount equals about 25% to about 40% excess to theoretical MCS amount on a mole to mole basis.
TSA results are reported as a percent of theoretical yield.
Solvent to $NH_3$ mass ratio equals about 25:1 to about 30:1.
Solvent to $NH_3$ mass ratio will be expressed as a whole number throughout this specification.

In the six runs, vacuum stripping was done from the reactor (typically at 10 to 18 psia) to a receiver in a liquid nitrogen 2 dewar. The stripping rate was about 2.2 gm/min through a ¼ inch line and standard cylinder valve opening. The crude product was collected in the receiver through a filter to remove any salt carry over from the reactor. Also, about 6%

(by mass) if the collected crude is estimated to be carried-over solvent, salt and heavies. In FIGS. 3-7, The X axis is time in minutes and the Y axis is temperature in °C. for the top broken line representing temperature and the Y axis is pressure (psig) for the bottom solid line of each figure.

Details on the Examples

In total, six runs were conducted in the 4 L reactor.

Example 8

The target reaction temperature 0° C.
Excess MCS equals about 63%
Solvent to NH3 mass ratio is 30 (30:1)

Figure 3:
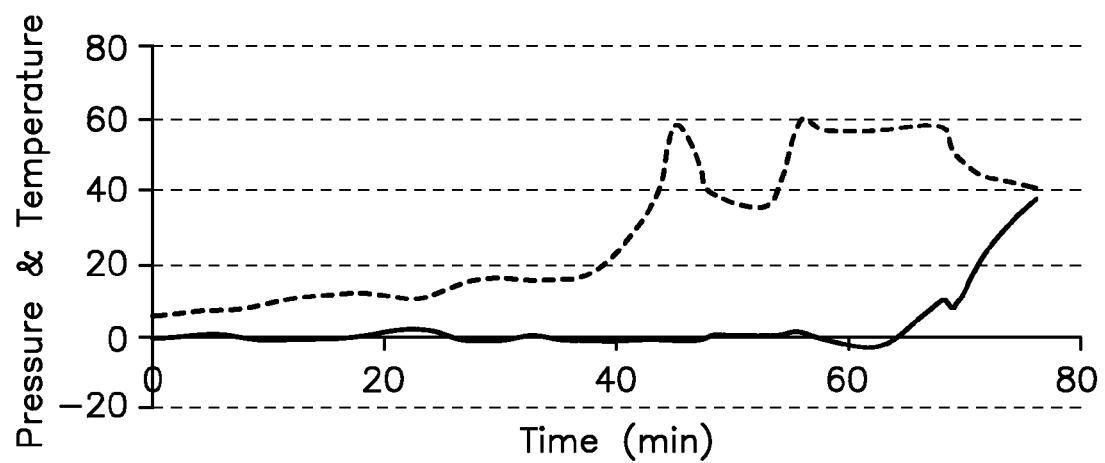
FIG. 3 is the graphic representation of temperature and pressure versus time for Experiment 8.

The temperature and pressure profile in the reactor as a function of time is shown in FIG. 3. The top broken line in FIG. 3 represents temperature (° C.) and the bottom solid line represents pressure (psig)

The fluctuations seen in the temperature were attributed to poor mixing. On further analysis it was determined that the viscosity of anisole is about 33% higher at 0° C. than at 20° C. So it may be that the higher viscosity of anisole combined with the increasing amount of salt in the reactor may have contributed to the temperature fluctuations. The TSA yield was 84%.

Example 9

The target reaction temperature −25° C./room temperature
Excess MCS −26%
Solvent to $NH_3$ Mass ratio=28.4

Figure 4:
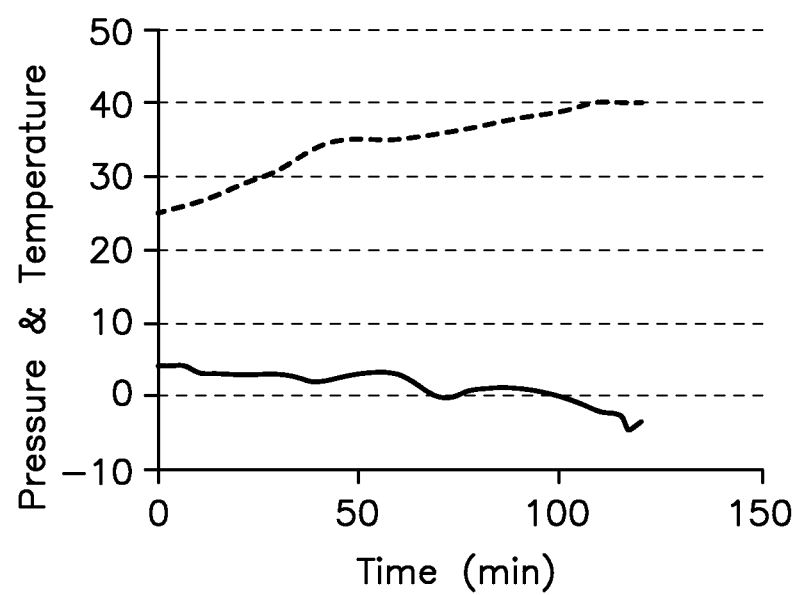
FIG. 4 is the graphic representation of temperature and pressure versus time for Experiment 9.

The temperature and pressure profile as a function of time is shown in FIG. 4. The top line in FIG. 4 represents temperature (° C.) and the bottom line represents pressure (psig). The TSA Yield was 85.4%.

Example 10

Twice the target amount of ammonia was added. The results of this run indicated that with excess $NH_3$, no TSA or MCS were produced and captured in the product receiver and that only $SiH_4$ and $NH_3$ were seen in the liquid and vapor phase. The TSA yield was 0%.

|  | Vapor Phase | Liquid Phase |
| --- | --- | --- |
| $SiH_4$ | 83.45% | 11.74% |
| $NH_3$ | 16.55% | 88.02% |

The initial pressure in the receiver, once warmed up, was more than 180 psig, above the vapor pressure of $NH_3$ at room temperature and so most of the $NH_3$ was seen in the liquid phase this observation indicates that (i) $NH_3$ and TSA react in the condensed phase to form silane and (ii) no such reaction happens in the vapor phase.

Example 11

Target reaction temperature=25° C./room temperature
Excess MCS=39%
Solvent to $NH_3$ ratio=25

Figure 5:
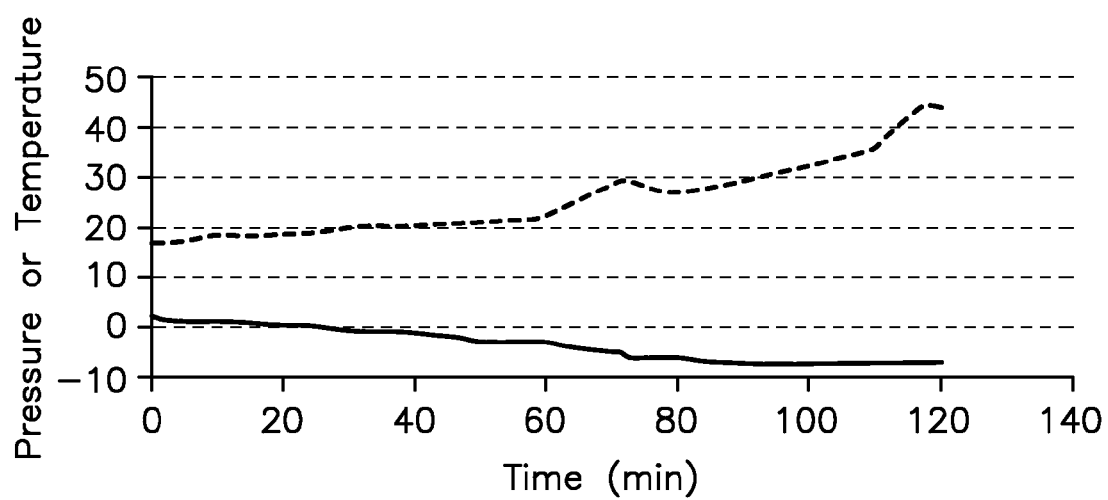
FIG. 5 is the graphic representation of temperature and pressure versus time for Experiment 11.

The pressure and temperature profile during the run is given in FIG. 5. The top line in FIG. 5 represents temperature (° C.) and the bottom line represents pressure (psig). The TSA Yield was 94.3%.

The reactor vapor phase was analyzed at different times during the run and the vapor phase concentration profile is given below.

The concentration of MCS decreased gradually during the run with the corresponding increase in concentration of other species such as $SiH_4$, TSA and DSA. Calculation of the partial pressures of different species (see table below) indicated that the $SiH_4$ in the vapor phase, at least initially, is from the $SiH_4$ in the MCS feed.

Partial Pressure as a Function of Time

| Time (min) | $SiH_4$ (psia) | MCS (psia) | DSA (psia) | TSA (psia) |
| --- | --- | --- | --- | --- |
| 18 | 1.79 | 22.73 | 0.00 | 0.00 |
| 59 | 2.44 | 16.46 | 0.62 | 0.79 |
| 110 | 3.66 | 9.82 | 1.15 | 2.66 |

The above results indicate that as the MCS in the liquid phase is consumed, the reaction shifts to the vapor phase with the formation of TSA increasing with time, with a corresponding decrease of MCS. The increase of $SiH_4$ amount can either be (i) $SiH_4$ in the MCS feed or (ii) decomposition of TSA in anisole due to the presence of salts.

Example 12

Figure 6:
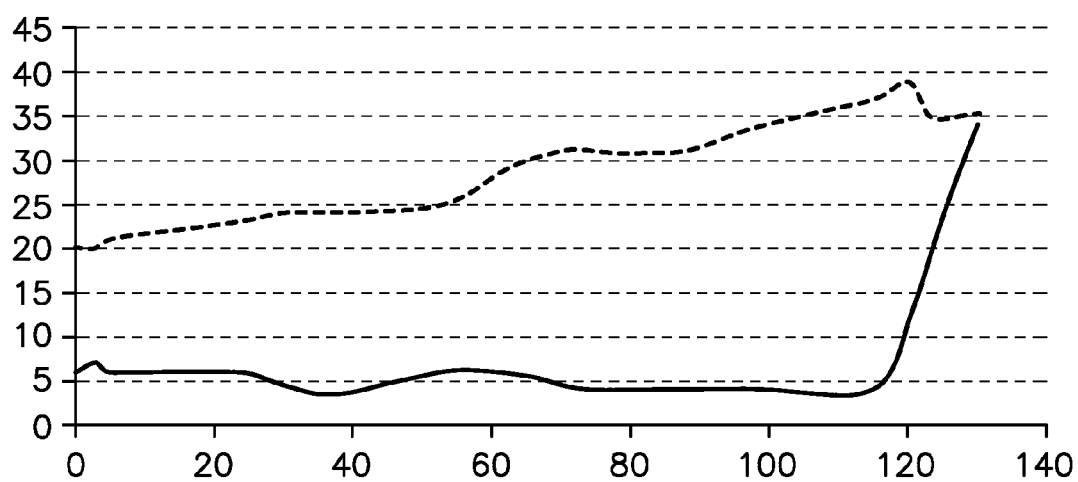
FIG. 6 is the graphic representation of temperature and pressure versus time for Experiment 12.

Target reaction Temp=25° C. or room temperature
Excess MCS=42%
Slovent/$NH_3$ Mass ratio=25
$NH_3$ addition rate=0.5 grams/min The pressure and temperature profile during the run is as follows in FIG. 6. The top line in FIG. 6 represents temperature (° C.) and the bottom line represents pressure (psig). The TSA Yield was 81.9%.

The reactor pressure was steady at about 5 psig for most of the run but after about 120 minutes the pressure increased rapidly. Samples of vapor phase in the reactor were taken at different times during the run.

The amount of silane in the vapor phase at t=0 (t=time) should be from the silane in the MCS feed. An analysis of the MCS feed showed that it contained about 1% silane and so based on the amount of MCS added it can be estimated that 1.08 gms of $SiH_4$ was added in the feed. An overall mass balance of silane showed that about 50% of the silane in the feed MCS is in the vapor phase and so the remaining should be solubilized in anisole. An independent set of tests conducted with MCS and anisole showed that about 66% of the $SiH_4$ in the MCS feed can be accounted for in the vapor phase.

Partial pressure of the different species as a function of reaction time was calculated (see table below).

Partial Pressure as a Function of Time

| Time (min) | $SiH_4$ (psia) | MCS (psia) | DSA (psia) | TSA (psia) | $SiH_4$ amt (grams) |
| --- | --- | --- | --- | --- | --- |
| 0 | 2.89 | 17.11 | 0.06 | 0.03 | 0.52 |
| 5 | 3.73 | 16.64 | 0.23 | 0.06 | 0.68 |
| 38 | 4.47 | 11.13 | 1.29 | 0.74 | 0.81 |
| 75 | 5.19 | 10.59 | 0.40 | 1.98 | 0.94 |
| 123 | 15.00 | 0.05 | 4.75 | 8.05 | 2.72 |

If the initial partial pressure of silane is subtracted from the partial pressures at different times, the differential partial pressure increases as a function of time. This is true even with a correction for an increase in reaction temperature as time progresses. This indicates that (i) there is some decomposition of TSA as more salt is formed or (ii) the silane dissolved in the solvent is slowly desorbing as the reaction proceeds. Given that at the end of the $NH_3$ addition, the amount of silane in the vapor phase exceeded that amount added via the MCS feed, the decomposition of TSA in the presence of salt with $SiH_4$ evolving has been demonstrated.

Example 13

Figure 7:
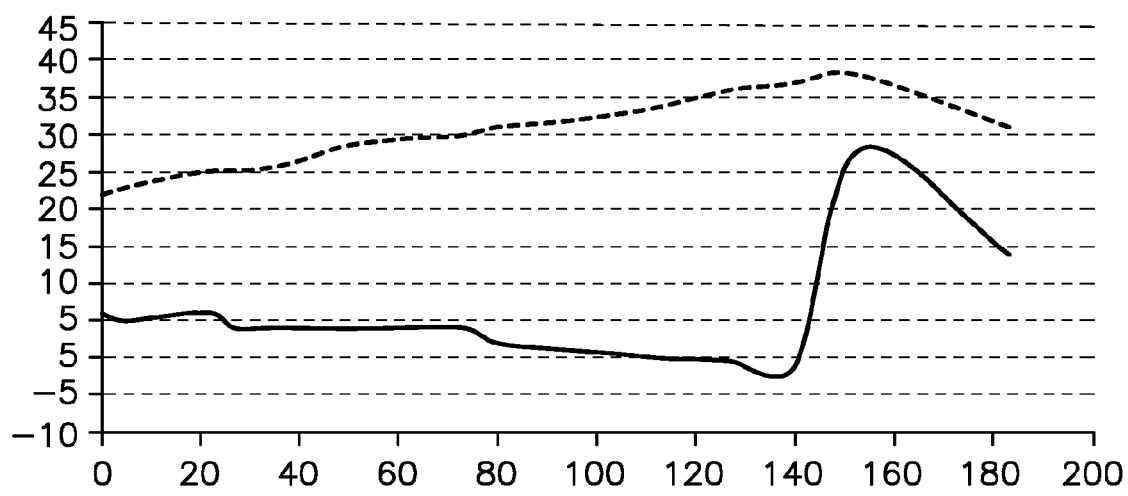
FIG. 7 is the graphic representation of temperature and pressure versus time for Experiment 13.

Target reaction Temp=25° C. or room temperature
Excess MCS=27%
Slovent/$NH_3$ Mass ratio=26
$NH_3$ addition rate=0.5 grams/min The pressure and temperature profile during the run is as follows in FIG. 6. The top line in FIG. 7 represents temperature (° C.) and the bottom line represents pressure (psig). The TSA Yield was 50.9%.

Partial pressure of different species as a function of time is given in the following table.
Partial Pressure as a Function of Time

| Time (min) | $SiH_4$ (psia) | MCS (psia) | DSA (psia) | TSA (psia) | $NH_3$ (psia) |
|---|---|---|---|---|---|
| 0 | 1.84 | 17.49 | 0.03 | 0.03 | 0 |
| 5 | 1.94 | 16.48 | 0.02 | 0.03 | 0 |
| 36 | 2.18 | 15.08 | 0.16 | 0.17 | 0 |
| 73 | 2.80 | 13.66 | 0.17 | 0.88 | 0 |
| 153 | 15.88 | 0.06 | 5.98 | 12.89 | 3.19 |
| 183 | 12.20 | 0.04 | 2.56 | 3.19 | 8.11 |

$NH_3$ addition was stopped at t=153 minutes and a sample was taken at that time. The reactor contents were continuously stirred for an additional 30 minutes and a sample was taken at t=183 min. Then only the reactor contents were vacuum stripped.

Again, subtracting the initial partial pressure of silane from the silane partial pressure at different times shows that the silane amount increases in the vapor phase over time, even after correcting for the temperature increase. Also, $NH_3$ break through was seen in this run whereas no $NH_3$ peaks were seen in the previous runs (Examples 9, 11 and 12). The major difference is that both the excess MCS of 25% and the solvent/$NH_3$ mass ratio of 25 are at the low end of the operating conditions.

TSA in was analyzed by a gas chromatographic procedure. The analysis conditions are indicated below.

| Product to be analyzed: | TSA |
|---|---|
| Impurities to be analyzed: | purity |
| Carrier | Helium |
| Column/Mesh | RTX-1 |
| Length | 105 m, 0.53 mm i.d. |
| Sampling condition | |
| Gas phase | 100 Torr static |
| Liquid phase-see NOTE 1 | 100 Torr static |
| Reference-see NOTE 2 | Varies |
| Oven Conditions: | |
| Initial Temp (° C.)/Time (min) | 35/4.5 |
| Ramp (° C./min) | 25 |
| Final Temp. (° C.)/Time (min) | 100/3.0 |
| Standby (overnight) Temp. (° C.) | 35 |
| Detector | TCD |
| Flow A (For TCD) | 20 +/− 2 mL./min |
| Flow B (For Ref. Gas) | 20 +/− 2 ml/min |
| Approximate Retention Times: | |
| $SiH_4$ | 1.9 min |
| MCS | 2.3 min |
| DSA | 3.6 min |
| TSA | 4.7 min |
| $Si_4NH_{11}$ (Other Silylamine) | 7.2 min |
| $Si_5N_2H_{14}$ (Other Silylamine) | 7.5 min |

The description of illustrative and preferred embodiments of the present invention is not intended to limit the scope of the invention. Various modifications, alternative constructions and equivalents may be employed without departing from the true spirit and scope of the appended claims.

I claim:

1. A process for preparing trisilylamine comprising:
   (a) adding a solvent to a reactor vessel;
   (b) adding monohalosilane into the solvent to form a solution;
   (c) adding anhydrous ammonia into the solution to form a reaction mixture;
   (d) forming trisilylamine in the reaction mixture;
   (e) separating silylamines from the reaction mixture; and
   (f) purifying trisilylamine;
   wherein the solvent is anisole.

2. The process of claim 1 further comprising adjusting the solvent temperature prior to adding the monohalosilane into the solvent to form a solution.

3. The process of claim 1 wherein the reactor vessel is maintained at a pressure of about two atmospheres or less.

4. The process of claim 1 wherein the monohalosilane is selected from the group consisting of monofluorosilane, monochlorosilane, monobromosilane and monoiodosilane.

5. The process of claim 1 wherein the monohalosilane is monochlorosilane.

6. The process of claim 2 wherein the solvent temperature is adjusted from about 70° C. to about −78° C. prior to adding monochlorosilane into the solvent.

7. The process of claim 2 wherein the solvent temperature is adjusted from about 50° C. to about −20° C. prior to adding monochlorosilane into the solvent.

8. The process of claim 1 wherein the molar ratio of monohalosilane to anhydrous ammonia is from about 1.05:1 to about 3:1.

9. A process for preparing trisilylamine comprising:
   (a) adding a solvent to a reactor vessel;
   (b) adding monohalosilane into the solvent to form a solution;
   (c) adding anhydrous ammonia into the solution to form a reaction mixture;
   (d) forming trisilylamine in the reaction mixture;
   (e) separating trisilylamine from the reaction mixture; and
   (f) purifying the trisilylamine;
   wherein the solvent is anisole, the monohalosilane is monochlorosilane.

10. The process of claim 9 further comprising adjusting the solvent temperature prior to adding the monohalosilane into the solvent to form a solution.

11. The process of claim 10 wherein the solvent temperature is adjusted from about 50° C. to about −20° C. prior to adding monochlorosilane into the solvent.

12. The process of claim 9 wherein the molar ratio of monohalosilane to anhydrous ammonia is from about 1.05:1 to about 3:1.

\* \* \* \* \*